Nov. 21, 1967  J. M. BUDD  3,353,773
DECORATIVE CUT TREE HOLDER
Filed Sept. 10, 1965

INVENTOR
JAMES M. BUDD
BY
ATTORNEY

United States Patent Office 3,353,773
Patented Nov. 21, 1967

3,353,773
DECORATIVE CUT TREE HOLDER
James M. Budd, 518 N. 7th, Osage, Iowa 50461
Filed Sept. 10, 1965, Ser. No. 486,508
4 Claims. (Cl. 248—44)

ABSTRACT OF THE DISCLOSURE

The holder utilizes a separate cable or chain which can be wrapped around the tree trunk at any place thereon in combination with a plurality of cinch-type rope fasteners for connection between the chain and a stand within which the tree is supported, and within which water can be placed, whereby any tree, whether or not the trunk is straight near the base, and whether or not limbs exist near the base can be supported in an upright position.

This invention relates generally to a support for a cut tree and the like, and more particularly to a holder for a decorative cut tree such as a Christmas tree.

Many Christmas tree or like holders are commercially available for supporting the tree in an upright manner on a level surface. Most of these holders, however, have a common disadvantage in that they require the lower trunk of the tree to be completely trimmed of all protruding branches. Furthermore, they require that the trunk of the tree be substantially straight and that the lower end thereof be cut at right angles to the longitudinal axis of the tree. Furthermore, the conventional type of Christmas tree holder is unduly limited as to the size of the tree which it will support.

To overcome all these disadvantages, and to provide a novel decorative tree holder is an object of this invention.

It is another object of this invention to provide a decorative tree holder having substantially no limitations as to a size of the cut tree capable of being held thereby.

Yet another object of this invention is to provide a holder for decorative cut trees which is readily adaptable for holding a tree which is unsymmetrical about its trunk, obviating thereby the chance of the tree tipping over.

It is still another object of this invention to provide a holder for decorative cut trees which does not require a trimming of the branches of the trees at the bottoms of the trunks thereof.

Another object of this invention is to provide a holder for decorative cut trees which adjustably maintains the trunk of the tree in the best position for displaying the tree, wherein one or more forks of the tree adjacent the base thereof are actually used as a means of supporting the tree.

Yet another object of this invention is to provide a holder as characterized hereinbefore which grippingly engages the base of the tree within the water receptacle thereof while adjustably holding the tree in an upright position for decorative purposes, and furthermore wherein water within the holder is always fully available to the cut base of the tree trunk.

In brief, and summarizing the invention, it comprises a base for rigidly holding a container, or wherein the container is integral therewith, which container is fluid tight for retaining water, and wherein within the container the base of the trunk of a tree can be placed, the invention including further a chain or like flexible member which can be wrapped around the tree trunk at any location thereon and to which a plurality of cinch-type cable fastening devices can be connected at any location thereon, which devices are also connected to the base for rigidly supporting the tree in an upright manner. If necessary the bottom of the container can be provided with spike like teeth, or a separate plate having upright teeth can be placed therein for giving further lateral support to the tree trunk.

Still another object of this invention is to provide a holder as characterized hereinbefore capable of attaining the objectives enumerated herein, which is economical to manufacture, simple in construction and assembly, and effective in use.

These objects, and other features and advantages of this invention will become readily apparent upon reference to the following description when taken in conjunction with the accompanying illustrations, wherein.

Figure 1:
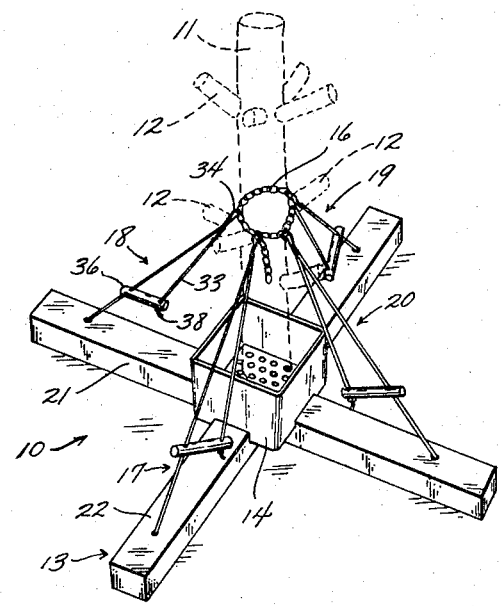
FIG. 1 is a perspective view of the decorative tree holder of this invention, shown in assembled relation with a portion of a cut tree, the latter shown in phantom.

Referring now to the drawings, the tree holder of this invention is indicated generally at 10 in FIG. 1 and is shown supporting the base of a tree 11 having a plurality of branches 12 protruding from the trunk adjacent the base thereof.

The holder 10 comprises a base 13, a water receptacle 14 mounted on the base 13 and adapted to receive the lower end of the trunk of the tree 11, a clamp 16 adapted to embrace the trunk of the tree 11 above the receptacle 14, and a plurality of guy devices 17, 18, 19 and 20 each of which is adjustable lengthwise for extension between the clamp 16 and the base 12 for bracing the tree 11 substantially perpendicularly on the base 13.

More particularly, the base 13 comprises a pair of elongated, rectangular members 21 and 22 of wood or the like. The members are oppositely notched at mid point, and indicated at 23 (FIG. 3) such as to be assembled in the form of a cross, and wherein their upper surfaces are substantially level. An aperture 24 is formed in each end of each member 21 and 22 such as to be normally vertically disposed, with the lower portion of each aperture 24 countersunk at 26.

Figure 3:
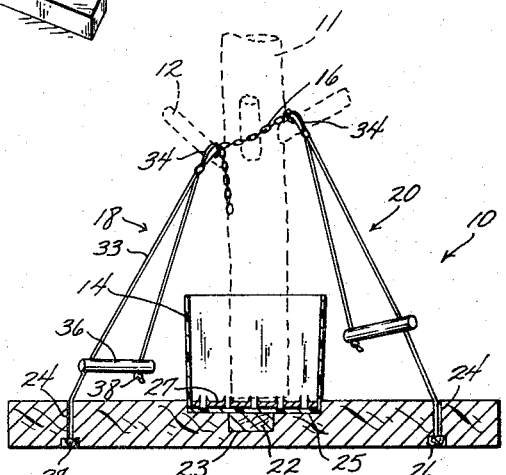
FIG. 3 is a vertical sectional view taken along the line 3—3, and wherein a portion of a cut tree is shown in phantom.

The water receptacle 14 is comprised preferably of plastic or the like and is adapted to seat, as best illustrated in FIG. 3, within a cutout area 25 formed in both members 21 and 22 at their intersected midpoints. Disposed in the bottom of the receptacle 14 is a serrated holder 27 which has a plurality of upstanding teeth 28 formed therein by means of a plurality of passages 29 punched therethrough. The outer dimensions of the plate 27 are such that it fits snugly inside the receptacle 14 on the bottom thereof. A plate 27 of plastic, wood, or the like could be provided without detracting from the function thereof.

The clamp 16 is preferably an elongated chain of indeterminate length, the chain being of the link type. It should be noted, however, that any other type of flexible clamp could be used. Although not shown, an S-type hook could be attached at one end of the clamp 16 to aid in attachment to the tree trunk.

Figure 2:
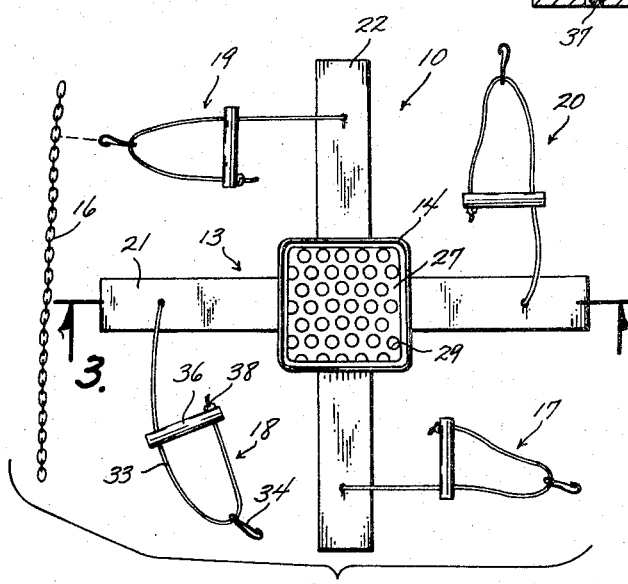
FIG. 2 is a partially exploded plan view of the tree holder of this invention shown in an assembled condition prior to use.

As each guy device 17–20 inclusive is identical, only one will be described. The device 18, for example, comprises a cord 33 (FIG. 2) of indeterminate length, a clip 34, and a dowel-type connector 36. The connector has a pair of passages formed in each end. The cord 33, which could be of plastic or the like, is knotted at both ends 37 and 38, with tne portion of the cord intermediate the knotted ends being passed through first the aperture 24 in a respective member 21 or 22, secondly through the passage in one end of the connector 36, then through the looped end 39 of a clip 34, and finally through the passage in the opposite end of the connector 36.

The connector 36 is thereby slidable on the two portions of the cord 33, wherein the cord is doubled upon itself. The clip 34 is also slidable on the cord 33.

To use the holder 10 to support a cut tree 11, the base members 21 and 22 are interlocked as illustrated in FIGS. 1 and 3, with the four cords 33 of the guy devices 17–20 passed through all four apertures 24. The receptacle 14 with the plate 27 seated therein as a unit is in the cutout 25 (FIG. 3) so that the base 41 of the tree 11 can then be impaled upon the teeth 28 of the plate 27.

The chain 16 is then looped about the tree trunk, for example at approximately 15 inches or more upwardly from the base 41 thereof, being draped over at least one fork formed in the tree by one or more of the branches 12 (see FIG. 3). Each clip 34 is then engaged with the chain 16 such that all four clips are equally spaced about the trunk of the tree 11. At this stage, all four guy devices are rather loose to enable easy handling of the clips 34.

With the clips 34 engaged, by manipulating the connector 36 so as to place a tension upon the cord 33, and to adjust the effective length of the four cords 33, the tree is braced substantially perpendicularly on the base 13. If an adjustment is necessary to any one or more of the guy devices 17–20, hand manipulation of the connector 36 of the particular guy device desired adjusted will readily result in the adjustment required.

Figure 4:
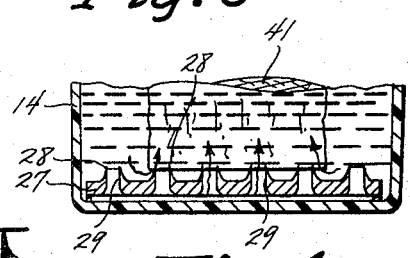
FIG. 4 is an enlarged detail sectional view of a portion of the structure.

Referring particularly to FIG. 4, it is seen that the teeth 28 of the plate 27 grippingly engage the base 41 of the tree 11, but that due to the passages 29 formed in the plate 27, water placed in the bottom of the receptacle 14 is permitted to pass into substantially the base 41 over its entire surface. Thus, by including the water receptacle 14 in the combination of elements, such that the base 41 of the tree 11 stands in water, the tree is kept fresh and green so that the needles will not fall off.

In a summation, a holder for a Christmas tree or the like has been disclosed herein which does not require the lower branches to be trimmed off, which does not require that the base of the tree be supported at a perfect right angle to the length thereof, which does enable an easily adjustable supporting of this type of tree in its most advantageous position for decorative purposes, and which does provide a simple, easily assembled and used, inexpensive holder.

Although a preferred embodiment of this invention has been described hereinbefore, it is to be remembered that various modifications and alterations can be made thereto without departing from the true spirit and scope of the invention as defined in the appended claims.

I claim:
1. A holder for decorative cut trees and the like comprising in combination:
 a base having a pair of elongated substantially flat arms intersecting each other at midpoints thereof at right angles, said arms each having a notch formed at midpoint for an interlocking engagement one with the other, whereby the overall surface of said base is substantially flat, but with a cut-out formed centrally in the upper surface thereof;
 a water receptacle mounted on said base and including upstanding teeth formed on the inner surface of the base thereof adapted to engage the lower end of the trunk of the tree to prevent lateral movement thereof, said receptacle insertable into said cut-out;
 clamp means including a flexible member, adjustable lengthwise and adapted to be looped about the trunk of the tree, disposed over at least one fork formed by a branch with the trunk; and
 guy means for lengthwise adjustable extension between said clamp means and said base for bracing the tree substantially perpendicularly on the base.

2. A holder for decorative cut trees and the like comprising in combination:
 a base having a pair of elongated substantially flat arms intersecting each other at midpoints thereof at right angles, said arms each having a notch formed at midpoint for an interlocking engagement one with the other, whereby the overall surface of said base is substantially flat, but with a cut-out formed centrally in the upper surface thereof;
 a water receptacle mounted on said base for receiving the lower end of the trunk of the tree;
 clamp means including a flexible member, adjustable lengthwise and adapted to be looped about the trunk of the tree, disposed over at least one fork formed by a branch with the trunk; and
 guy means including a plurality of elongated, flexible members extended in an arcuately spaced symmetrical manner between said clamp means and said base, each member doubled upon itself, said guy means including further a connector for each member, with the free end of each member connected to one end of said connector, and the portion of each said member between said base and said clamp means slidably inserted through the other end of said connector; and
 a plate positionable in the bottom of said receptacle having upstanding teeth formed thereon on which the trunk can be impaled.

3. A holder for decorative cut trees and the like comprising in combination:
 a base having a fluid tight, open top, water receptacle integrally formed therein for receiving within said receptacle the lower end of the trunk of a tree;
 clamp means including a flexible member adapted to embrace the trunk of the tree above said base;
 guy means including a plurality of elongated, flexible members extended in an arcuately spaced symmetrical manner between said clamp means and said base, each member doubled upon itself, said guy means including further a connector for each member, with the free end of each member connected to one end of said connector, and the portion of each said member between said base and said clamp means slidably inserted through the other end of said connector; and
 means within said receptacle for gripping the trunk at the undersurface of the base thereof.

4. A holder for decorative cut trees and the like as defined in claim 3, and wherein said base and said receptacle are separable, said base having a cavity formed therein for snugly receiving said receptacle and maintaining the tree trunk against lateral movement.

References Cited

UNITED STATES PATENTS

| 2,444,390 | 6/1948 | White | 248—48 |
| 2,652,703 | 6/1953 | Keegan | 248—346.1 |
| 2,671,624 | 3/1954 | Carney | 248—48 |
| 3,044,476 | 7/1962 | Avery | 135—1 |

FOREIGN PATENTS

| 932,432 | 7/1963 | Great Britain. |

CHANCELLOR E. HARRIS, *Primary Examiner.*